United States Patent
Nair et al.

(10) Patent No.: US 10,224,991 B2
(45) Date of Patent: Mar. 5, 2019

(54) METHOD OF SELECTING PLURALITY OF SETS OF OPTIMAL BEAM PAIRS IN WIRELESS COMMUNICATION SYSTEM

(71) Applicant: Samsung Electronics Co., Ltd., Gyeonggi-do (KR)

(72) Inventors: Jinesh Parameshwaran Nair, Karnataka (IN); Ranjit Kumar, Karnataka (IN); Atanu Guchhait, Karnataka (IN); Dae-Ryong Lee, Gyeonggi-do (KR); Ved Prakash, Karnataka (IN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/872,417

(22) Filed: Jan. 16, 2018

(65) Prior Publication Data
US 2018/0205435 A1 Jul. 19, 2018

(30) Foreign Application Priority Data

Jan. 16, 2017 (IN) .................. 201741001716 PS
Jan. 15, 2018 (IN) .................. 201741001716 CS

(51) Int. Cl.
*H04B 7/06* (2006.01)
*H04B 7/0456* (2017.01)
*H04B 7/08* (2006.01)

(52) U.S. Cl.
CPC ......... *H04B 7/0615* (2013.01); *H04B 7/0456* (2013.01); *H04B 7/0695* (2013.01); *H04B 7/088* (2013.01)

(58) Field of Classification Search
CPC .... H04B 7/0615; H04B 7/0695; H04B 7/088; H04B 7/0456
See application file for complete search history.

(56) References Cited

U.S. PATENT DOCUMENTS

2013/0336214 A1* 12/2013 Sayana .................. H04B 7/024
                                                    370/328
2014/0334564 A1* 11/2014 Singh .................... H04B 7/0413
                                                    375/267

(Continued)

OTHER PUBLICATIONS

Chanhong Kim ; Taeyoung Kim ; Ji-Yun Seol, Multi-beam transmission diversity with hybrid beamforming for MIMO-OFDM systems, Dec. 2013 (Year: 2013).*

*Primary Examiner* — Kenneth T Lam
(74) *Attorney, Agent, or Firm* — The Farrell Law Firm, P.C.

(57) ABSTRACT

The present disclosure provides a method of selecting a plurality of sets of beam pairs in a wireless communication system. The method includes estimating, by a receiver, channels associated with a plurality of transmit ports for each receive port of a plurality of receive ports; and determining, by the receiver, the plurality of sets of the beam pairs including transmit beam and receive beam using: an average power level at each receive port for at least one transmit port based on the estimated channel associated between the beam pairs, a set of first power matrices, wherein each first power matrix, from the set of first power matrices, comprises at least one transmit port, beam ID pairs including transmit beam ID and receive beam ID associated with each receive port, wherein the set of first power matrices is formed based on the average power level at each of the receive port, and a second capacity matrix formed based on capacity maximization obtained from the set of first power matrices, wherein the plurality of sets of the beam pairs associated with each of the transmit port and receive port is selected from the second capacity matrix.

18 Claims, 9 Drawing Sheets

(56) References Cited

U.S. PATENT DOCUMENTS

| | | | |
|---|---|---|---|
| 2015/0124738 A1* | 5/2015 | Ramakrishna | H04L 5/0048 |
| | | | 370/329 |
| 2015/0236768 A1* | 8/2015 | Murakami | H04B 7/0456 |
| | | | 375/298 |
| 2016/0072568 A1* | 3/2016 | Mun | H04L 1/0026 |
| | | | 375/267 |
| 2018/0006784 A1* | 1/2018 | Su | H04B 7/26 |

* cited by examiner

FIG.6

METHOD OF SELECTING PLURALITY OF SETS OF OPTIMAL BEAM PAIRS IN WIRELESS COMMUNICATION SYSTEM

CROSS-REFERENCE TO RELATED APPLICATION(S)

This application claims priority under 35 U.S.C. § 119(a) to Indian Patent Application Serial No. 201741001716 (PS), which was filed in the Indian Patent Office on Jan. 16, 2017 and Indian Patent Application Serial No. 201741001716 (CS), which was filed on Jan. 15, 2018, the entire disclosure of each of these applications is incorporated herein by reference.

BACKGROUND

1. Field

The present disclosure relates, generally, to wireless communication systems, and more particularly, to a method and system for selecting plurality of sets of optimal beam pairs in a wireless communication system.

2. Description of the Related Art

Millimeter wave beamforming is one of the key technologies for 5G-communications. The large swathes of bandwidth at these frequencies enable high data rate communication. Beamforming is required in such 5G communication systems to compensate for the significantly higher path loss. Transmit beamforming using directional beam-patterns focuses the transmit signal in one of the possible spatial directions. Similarly, in receive beamforming, the receive beams facilitate directional selectivity of the received signals.

In a beam-formed system the optimal transmit and receive beams needs to be determined for reliable communication. In a single-input and single-output (SISO) system, a single transmit beam and receive beam pair needs to be estimated for a single stream transmission. In a multi-input and multi-output (MIMO) system, multiple transmit beam and receive beam pairs for the multiple streams need to be estimated. A beam set can include multiple beam-pairs, and a plurality of such sets need to be estimated with the objective of reliable communication in the presence of beam blockages and misalignments, which can be performed using beam-training mechanisms. The beam-training mechanisms require a receiver to reliably estimate optimal beams (directionality) from a set of possible beams in a face of fading, interference and noise.

Evolving 5G specifications typically need incorporation of periodic and a periodic beam-control signalling along with data transmission to estimate and track the beam-pairs associated with a base station (BS) and user equipment (UE). In the 5G specifications, these signals can be referred to as beam-reference signals (BRS). The other signals that are typically used for beam training are the synchronization signals (SS) and channel state information reference signals (CSI-RS).

Methods in which optimal transmit beam and receive beam pairs are selected using both capacity maximization and power maximization are known. However, such methods when adapted towards higher number antenna configurations and beams results in unmanageable complexity, which therefore makes the selection of the optimal beam pairs extremely difficult for practical implementation. Also the performance of the existing methods is affected in the presence of interference, blockages and misalignments.

SUMMARY

The disclosure has been made to address at least the disadvantages described above and to provide at least the advantages described below. Accordingly, an aspect of the disclosure provides a method of selecting a plurality of sets of optimal or best transmit beam and receive beam pairs in a wireless communication system.

Another aspect of the disclosure provides a method of determining the plurality of sets of optimal transmit beam and receive beam pairs using a capacity maximization (CM) technique on a reduced search space obtained from a power maximization method.

Another aspect of the disclosure provides a method of identifying at least one transmit and receive beam identifiers (ID) pairs by traversing diagonally across a matrix, wherein at least one beam ID pair is anchored. A scan over at least one beam ID pair in the matrix is performed using the anchored at least one beam ID pair to identify one or more beam ID pairs.

In accordance with an aspect of the disclosure, there is provided a method of selecting a plurality of sets of beam pairs in a wireless communication system. The method includes estimating, by a receiver, channels associated with a plurality of transmit ports for each receive port of a plurality of receive ports; and determining, by the receiver, the plurality of sets of the beam pairs including transmit beam and receive beam using: an average power level at each receive port for at least one transmit port based on the estimated channel associated between the beam pairs, a set of first power matrices, wherein each first power matrix, from the set of first power matrices, comprises at least one transmit port, beam ID pairs including transmit beam ID and receive beam ID associated with each receive port, wherein the set of first power matrices is formed based on the average power level at each of the receive port, and a second capacity matrix formed based on capacity maximization obtained from the set of first power matrices, wherein the plurality of sets of the beam pairs associated with each of the transmit port and receive port is selected from the second capacity matrix.

In accordance with an aspect of the disclosure, there is provided a method of selecting a plurality of sets of beam pairs in a wireless communication system. The method includes estimating, by a receiver, channels associated with a plurality of transmit ports for each receive port of a plurality of receive ports; and determining, by the receiver, the plurality of sets of the beam pairs including transmit beam and receive beam by: identifying at least one beam ID pairs including transmit beam ID and receive beam ID by traversing diagonally across a first matrix, anchoring, by the receiver, the at least one beam ID pairs identified in the first matrix, performing, by the receiver, a scan over at least one beam ID pairs in the first matrix using the at least one anchored beam ID pairs, and determining, by the receiver, the plurality of sets of the beam pairs based on the scan over the at least one anchored beam ID pairs.

In accordance with an aspect of the disclosure, there is provided a receiver for selecting a plurality of beam pairs in a wireless communication system. The receiver includes a memory, a processor coupled to the memory, and a beam pair selector, coupled to the processor and configured to: estimate channels associated with a plurality of transmit ports for each receive port of a plurality of receiver ports for the beam pairs including transmit beam and receive beam; and determine the plurality of sets of the beam pairs using: average power level at each receive port for at least one transmit port based on the estimated channel associated between the beam pairs, a set of first power matrices, wherein each first power matrix, from the set of power matrices, comprises at least one transmit port, beam ID pairs including transmit beam ID and receive beam ID associated with each receive port, wherein the set of first power matrices is formed based on the average power level at each of the receive port, and a second capacity matrix formed based on capacity maximization obtained from the set of first power matrices, wherein the plurality of sets of the beam pairs associated with each of the transmit port and receive port is selected from the second capacity matrix.

In accordance with an aspect of the disclosure, there is provided a receiver for selecting a plurality of sets of beam pairs in a wireless communication system. The receiver includes a memory, a processor coupled to the memory, and a beam pair selector, coupled to the processor, configured to: estimate channels associated with a plurality of transmit ports for each receive port from a plurality of receive ports, and determine the plurality of sets of the beam pairs including transmit beam and receive beam by: identifying at least one beam ID pairs including transmit beam ID and receive beam ID by traversing diagonally across a first matrix, anchoring the at least one beam ID pairs identified in the first matrix, performing a scan over at least one beam ID pairs in the first matrix using the at least one anchored beam ID pairs, and determining the plurality of sets of the beam pairs based on the scan over the at least one anchored beam ID pairs.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 6 is a diagram of a matrix for selecting a plurality of set of optimal beam ID pairs, according to an embodiment;

DETAILED DESCRIPTION

Figure 1A:
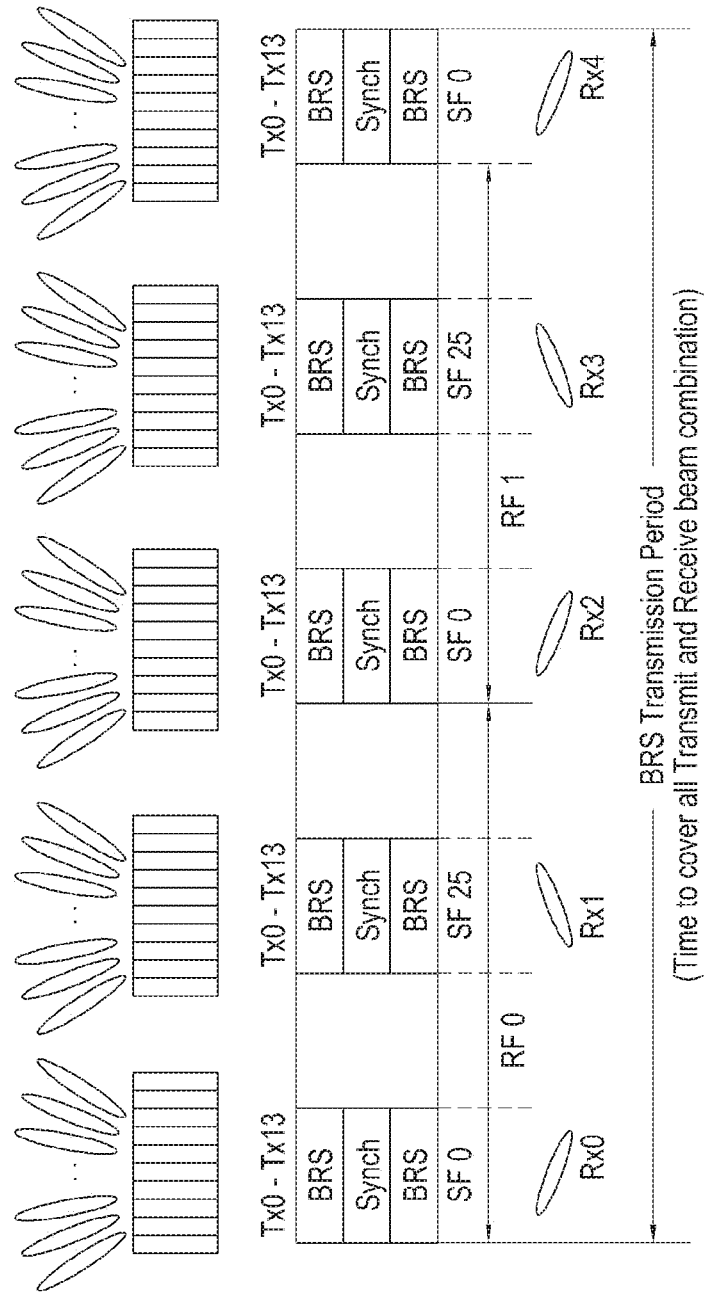
FIG. 1A is a diagram of a beam-training mechanism, according to known prior art.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

Accordingly embodiments herein provide a method of selecting a plurality of sets of optimal beam pairs from a plurality of beam pairs in a wireless communication system. The proposed method includes estimating, by a receiver, a channel associated with at least one transmit port from a plurality of transmit ports associated with each receive port from a plurality of receiver ports for all beam pairs including transmit beam and receive beam. Further, the proposed method includes determining, by the receiver, the sets of optimal beam pairs using an average power level of each receiver port for the at least one transmit port based on the estimated channel, a first matrix comprising the at least one transmit port and beam ID pairs associated with each receive port, wherein the first matrix is formed by processing each OFDM symbol based on the power level of each receiver port, and a second matrix formed based on at least one capacity and SINR associated with each beam ID pair obtained from a plurality of first matrices, wherein the plurality of sets of optimal transmit beam and receive beam pair is selected based on the second matrix. Accordingly embodiments herein provide a method of selecting a plurality of optimal transmit and receive beam pairs in a wireless communication system. The proposed method includes estimating, by a receiver, a channel associated with a plurality of transmit ports for each receive port from a plurality of receiver ports. Further the proposed method includes determining, by the receiver, the optimal beam pair by identifying, by the receiver, at least one beam ID pair by traversing diagonally across a first matrix, anchoring, by the receiver, the at least one beam ID pair identified in the first matrix, performing, by the receiver, a scan over at least one beam ID pair in the first matrix using the anchored at least one beam ID pair, and determining, by the receiver, the plurality of optimal beam pairs based on the scan over the at least one anchored beam ID pair.

Unlike to conventional methods and systems, the proposed method can be used to reduce a complexity for practical implementation by using an intelligent combination of both a CM and a received power maximization (PM)

techniques without compromising on the performance while identify the one or more sets of optimal transmit and receive beam pairs.

FIG. 1A is a diagram of a beam-training scheme, according to known prior art.

Downlink multiple input multiple output-orthogonal frequency division multiplexing (MIMO-OFDM) based communication systems include a transmitter (Tx) and a receiver (Rx) which can be a BS, a UE, a mobile station (MS), etc. The transmitter includes $N_T$ transmit antenna ports connected to antenna arrays comprising of $N^{RF}_T$ antennas via phase shifters. Similarly, the receiver includes $N_R$ receive antenna ports connected to antenna arrays with $N^{RF}_R$ antennas. The number of data streams $N_s$ that could be transmitted simultaneously is limited by the number of radio frequency (RF) chains at the transmitter and receiver, $Ns \leq \min\{N_T, N_R\}$. Hence the number of elements in each of the plurality of sets of best transmit receive beam pairs is limited by Ns.

The transmitter generates a beam reference signal (BRS) and sub-frame(s) (SF) of the BRS are transmitted once every 5 ms comprising of $N_{SF}=14$ OFDM symbols. Each BRS are placed in the $1^{st}$ and $25^{th}$ sub-frames of the 10 ms radio frame comprising of 50 SFs.

In each BRS sub-frame, the OFDM symbols are generated in the following manner. Initially, quadrature phase shift keying (QPSK) modulation is performed on BRS sequences, $r_1(m)$, where l and m vary as, ($l=0, 1, \ldots, N_{SF}-1$), ($m=0, 1, \ldots, N_c=8[N^{DL}_{RB}-18]-1$), and $N^{DL}_{RB}=100$ are generated from a pseudo-random sequence, where $N_C$ is the length of the BRS sequence. The BRS sequences are a function of the OFDM symbol index l and the cell-ID $N^{cell}_{ID}$.

Consider $r_1=[r_1(m)|m=0, 1, \ldots, Nc-1]^T$ be the BRS sequence vector for the $1^{th}$ OFDM symbol. The BRS sequences $r_1(m)$ are then mapped to modulation symbols $t^p_l(k)$, which is a BRS symbol associated with the $p^{th}$ antenna port, where ($p=0, 1, \ldots, N_T-1$), and the $1^{th}$ OFDM symbol on the $k^{th}$ subcarrier. Let $t_l(k)=[t^p_l(k), |p=0, 1, \ldots, N_T-1]$ be the corresponding vector.

The number of transmit antenna ports to $N_T=8$. The BRS symbols are calculated by Equation (1):

$$t^p_l(k) = g_{\bar{p}}(m')rl(m). \quad (1)$$

Here, $g_{\bar{p}}(m')$, $m'=m \, N_T$ is an antenna port specific cover sequence drawn from the $p^{th}$ row of an $N_T \times N_T$ Hadamard matrix G. $k=N^{RB}_{SC} k'+k'$, $N^{RB}_{SC}=12$ is the sub-carrier index for the modulated symbols, where ($k''=4, \ldots N_{SF}-1$) and ($k'=0, 1, \ldots, [\frac{1}{2} (N^{DL}_{RB}-18)]-1$, $[\frac{1}{2} (N^{DL}_{RB}+18)]$, $[\frac{1}{2}(N^{DL}_{RB}+18)]+1, \ldots, N^{DL}_{RB}-1$).

The frequency domain BRS symbols $t^p_l(k)$ are OFDM modulated to obtain $\tilde{t}^p_l(n)$ which is calculated using Equation (2):

$$\tilde{t}^{p_1}(n) = \frac{1}{\sqrt{NFFT}} \sum_{K=0}^{NFFT-1} t^p_l(k) e^{j\frac{2\Pi nk}{NFFT}} \quad (2)$$

where $\tilde{t}^p_l(n)$ is cyclic prefixed (CP) to obtain $t^p_l(n)$ which is the $n^{th}$ sample of the $l^{th}$ OFDM symbol associated with the $p^{th}$ antenna port. Let $t_l(n)=[t^0_l(n), t^1_l(n), \ldots, t^{NT-1}_l(n)]$ be the vector of samples at the $n^{th}$ time instant that are fed to the $N_T$ RF chains, from the $l^{th}$ OFDM symbols. The beam formed output vector $t_l(n)$ can be calculated using Equation (3):

$$t'_l(n)=W_l t_l(n). \quad (3)$$

Here, $W_l$ is an $N_T N^{RF}_T \times N_T$ analog beam-forming matrix with a block diagonal structure which can be calculated using Equation (4):

$$W_l = \text{diag}\{a_t^*(\emptyset_o), a_t^*(\emptyset_l), \ldots, a_t^*(\emptyset_{NT-1})\}, \quad (4)$$

where $a_t^*(\emptyset_i)$ with dimensions $N^{RF}_T \times 1$, corresponds to the analog steering vector for the $i^{th}$ transmit array antenna ($i=0, 1, \ldots, N_T-1$). $\emptyset i$ is the azimuth steering angle from the antenna boresight corresponding to the analog beam former of the array antenna connected to the $i^{th}$ RF chain. The elements of $a_t^*(\emptyset i)$ are dependent on the array geometry and without loss of generality, only 2-D beamforming (linear array) is considered for simplicity. The techniques and results which are presented is applicable to arbitrary antenna arrays. The baseband precoding is not applied on the BRS symbols as based band precoding are used to estimate the analog RF beams only. The $W_l$ can be calculated using Equation (5):

$$W_l = \begin{bmatrix} a_t^*(\phi_0) & 0_{N^{RF}_T} & \cdots & 0_{N^{RF}_T} \\ 0_{N^{RF}_T} & a_t^*(\phi_1) & \cdots & 0_{N^{RF}_T} \\ \vdots & \vdots & \ddots & \vdots \\ 0_{N^{RF}_T} & 0_{N^{RF}_T} & \cdots & a_t^*(\phi_{N_T-1}) \end{bmatrix} \quad (5)$$

Each $a_t^*(\emptyset i)$ can take on a discrete set of possible values such as number of transmitter beams ($N_{T \times B}$), depending on the quantized beamforming codebook design. Each set corresponds to a beam which is characterized by the antenna port number $P_i$ and the beam index (beam-ID) $B_j$ at the transmitter which is represented as T ($P_i$, $B_j$) can be calculated using Equation (6):

$$a_t^*(\emptyset_i) \leftrightarrow T(P_i, B_j) \begin{array}{l} i = 0, 1, \ldots, N_T - 1 \\ j = 0, 1, \ldots, N_{T \times B} - 1 \end{array} \quad (6)$$

At the receiver side, a mapping of a transmit beam index to an OFDM symbol in the BRS is obtained. The analog beams remain unchanged during one OFDM symbol duration. The time taken to transmit all the distinct beams is characterised by the beam transmission period (hereinafter TBTP) denoted by $\Delta t$. This is illustrated in FIG. 1A with T ($P_m$, $B_n$), $W_l$ and $a_t^*(\emptyset i)$ in Equations (4) and (6) remaining unchanged for the duration of the transmitted OFDM symbol and changes from symbol to symbol in the BRS sub-frames within every TBTP. The scheme sweeps across the maximum number of transmit beam training opportunities available.

At the receiver side, the transmitted signal passes through the millimeter wave channel and reaches each receiver RF chain. The CP portion of the signal is removed. The received signal $y_l(k)$ with dimensions $N_R \times 1$ in the presence of additive white Gaussian noise (AWGN) on the $k^{th}$ subcarrier can be calculated using Equation (7):

$$Y_1(k)=V^T_l H_l(k) W_l t_l(k)+V^T_l n(k). \quad (7)$$

$H_l(k)$ is an ($N_R N^{RF}_R \times N_T N^{RF}_T$) frequency domain full channel matrix of the $l^{th}$ OFDM symbol for the $k^{th}$ subcarrier. The channel model is not presented here for brevity. $W_l$ and hence $H_l(k)$ change on an OFDM symbol basis as explained above. $n(k) \sim C\bar{N}(0 N_R N^{RF}_R, \sigma^2_n I \, N_R N^{RF}_R)$ is the noise vector.

Similar to Equations (4) and (5), $V_l$ is the receive analog beamforming phase shifters expressed as a block diagonal matrix with dimensions $N_R N^{RF}_R \times N_R$ and can be calculated using Equation (8):

$$V_l = \text{diag}\{a_r^*(\emptyset_o), a_r^*(\emptyset_l), \ldots a_r^*(\emptyset_{NR-1})\}, \quad (8)$$

where $a_r^*(\emptyset i)$ with dimensions $N^{RF}_R \times 1$, corresponds to the analog steering vector for the $i^{th}$ receive array antenna (i=0, 1, ..., $N_R-1$) is the steering angle from the antenna boresight corresponding to the analog beam former of the array antenna connected to the $i^{th}$ RF chain. Just as in the case of the transmitter, the $a_r^*(\emptyset i)$ can take a discrete set of values, say number of receiver beams ($N_{R \times B}$), wherein each set corresponds to a beam which is characterised by $P_i$ and $B_j$; this can be represented as $R(P_q, B_s)$ and can be calculated using Equation (9):

$$a_r^*(\theta_i) \leftrightarrow R(P_i, B_j) \begin{matrix} i = 0, 1, \ldots, N_R - 1 \\ j = 0, 1, \ldots, N_{R \times B} - 1 \end{matrix} \quad (9)$$

The beam-training protocol is explained at FIG. 1A. A single beamformed communication link comprises of a channel associated with a pair of transmit beams T ($P_m$, $B_n$) and receive beams R($P_r$, $B_s$) having an array gain of $N^{RF}_T N^{RF}_R$. This represents one of the SISO links. Let this 4-tuple be represented by $A_i$ which is calculated using Equation (10):

$$A_i = \{T(Pm, Bn), R(Pq, Bs)\}. \quad (10)$$

Here, i is defined as $\{0, N_T N_R N_{T \times B} N_{R \times B} - 1\}$. The time taken at the receiver to obtain all possible channel measurements of $A_i$ is referred to as the beam training period (hereinafter RBTP) denoted by $\Delta_r$. The object of the beam-forming protocol is to provide scope at the receiver to facilitate the measurement of these channels so as to decide on the optimal beam pairs for reliable communication.

The receiver fixes its beam, R($P_r$, $B_s$)↔$a_r^*(\emptyset_i)$ for the BRS subframes that fall within the duration of Δt and switches to the next receive beam for the next Δt and so on to sweep across all the beams in the Δr as seen in FIG. 1A. Hence the Δr can be expressed as Δr=$N_{R \times B}$ Δt. All the received OFDM symbols in the BRS subframes within the Δr, are influenced by the same receive beam R($P_r$, $B_s$).

The objective of beam-selection methods is to estimate T ($P_m$, $B_n$)↔$a_r^*(\emptyset_m)$ and R(Pq, Bs)↔$a_r^*(\emptyset_q)$ from the received OFDM symbols $y_l(k)$ in the BRS subframes for reliable communication. $a_r^*(\emptyset_m)$ and $a_r^*(\emptyset_q)$ that closely match the channels array response vectors so as to maximize the array gain and minimize the interference are desirable.

In FIG. 1A, $y_l(k)$ provides information of the transmit and receive beam-ID but does not provide information of the ports. For this, the $N_T N_R N_{T \times B} N_{R \times B}$ channel estimates are needed from $y_l(k)$.

The effective beamformed channels from all the transmit antenna ports are estimated at each of the received antenna ports. Let $Y_l = [y_l(0), y_l(1) \ldots y_l(N_c-1)]$ be a $N_R \times N_C$ matrix formed from the received BRS symbols of the lth OFDM symbol. $N_C$ is the length of the BRS sequence. The combined BRS received symbols of the transmit ports are separated from each other using a decovering operation on a per OFDM symbol basis to obtain the channel estimate using Equation (11):

$$\tilde{H}^T_l(\dot{k}) = G_{r1}[m:n]l \, N_T Y^T_l[:, m:n], \quad (11)$$

where m and n are calculated using Equation (12):

$$m = \dot{k} N_T, n = m + N_T - 1$$

$$\dot{k} = 0, 1, \ldots, N_h - 1. \quad (12)$$

Here, $\tilde{H}^T_l(k)$ has dimensions $N_R \times N_T$ where each element corresponds to the channel estimate with its associated $A_i$. $N_h = N_C/N_T$ are the number of channel estimation matrices obtained per OFDM symbol. Improved accuracy can be obtained by averaging the estimates over the channel coherence bandwidth.

The orthogonality property of the Hadamard sequences enable channel estimation of a particular transmit-receive beam pair combination of all the transmit and receive ports from each received OFDM symbol. Hence from one received OFDM symbol, $\{Ai|i=0, 1, \ldots, N_R N_T\}$ are obtained to estimate such channels. For the duration of Δt, $N_R N_T N_{T \times B}$ channels are obtained for the duration of Δt all $N_R N_T N_{T \times B} N_{R \times B}$ channels are obtained at FIG. 1A.

Figure 1B:
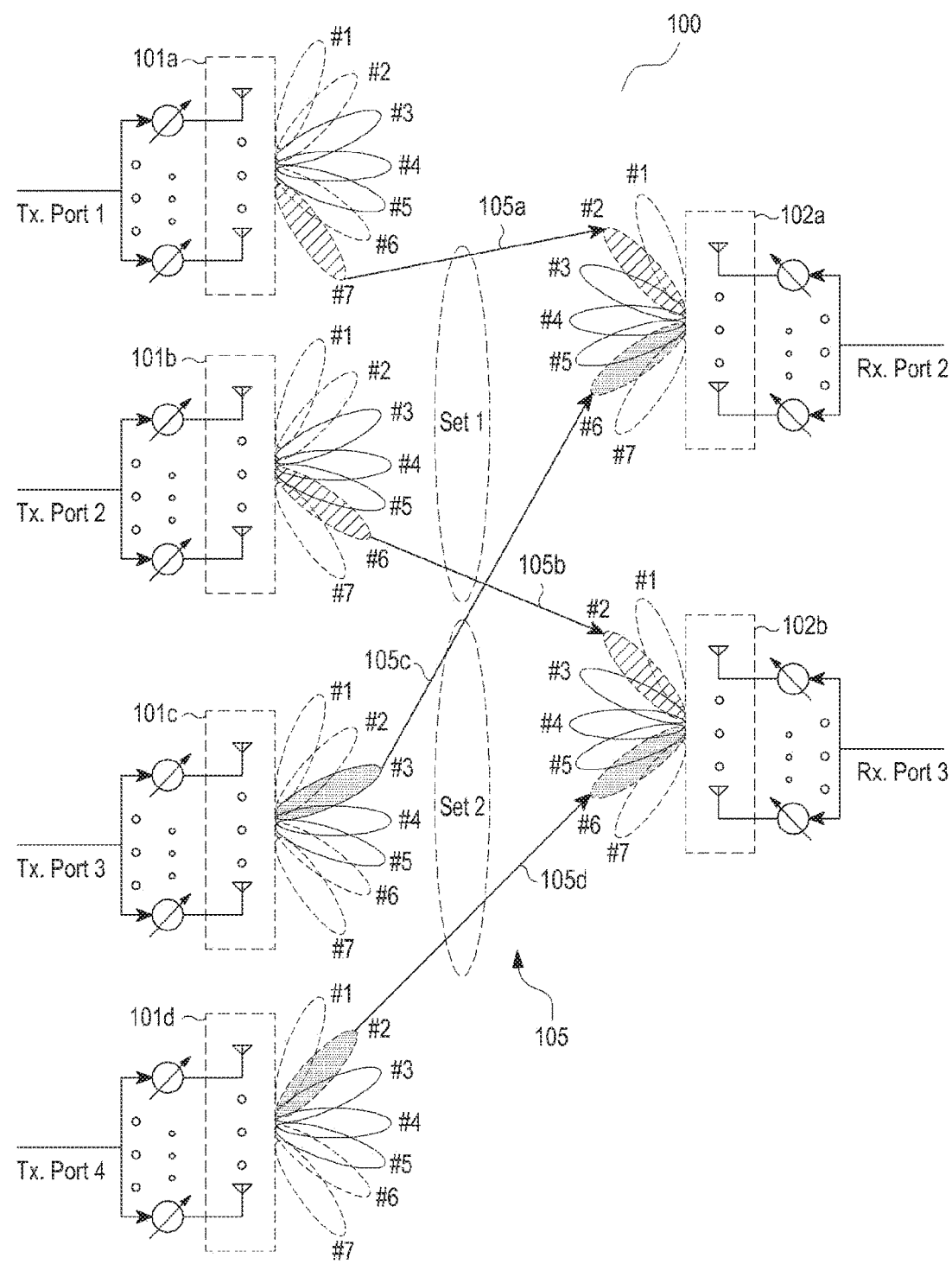
FIG. 1B is a diagram of a plurality of sets of directional links between a transmitter and a receiver in a wireless communication system, according to known prior art.

FIG. 1B is a diagram of a plurality of sets of directional links 105 between a transmitter antenna array 101 and a receiver 102 in a wireless communication network 100, according to known prior art.

Consider an example, where transmitter 101 includes transmitter antenna arrays 101a-101d connected to transmit antenna ports which transmit the plurality of directional links 105 to the receiver antenna arrays 102a-102b of the receiver 102 connected receiver antenna ports. The sets of plurality of directional links may include N links, e.g., including links 105a-105d between the transmitter antenna array 101 and the receiver antenna array 102.

For example, a BRS, denoted as #7, of the transmitter antenna array 101a may form the directional link 105a with a BRS, denoted as #2, of the receiver antenna array 102a. A BRS, denoted as #6, of the transmitter antenna array 101b may form the directional link 105b with a BRS, denoted as #2, of the receiver antenna array 102b. A BRS, denoted as #3, of the transmitter antenna array 101c may form the directional link 105c with a BRS, denoted as #6, of the receiver antenna array 102a. A BRS, denoted as #2, of the transmitter antenna array 101d may form the directional link 105d with a BRS, denoted as #6, of the receiver antenna array 102b.

In existing methods, the sets of plurality of directional links 105 may be determined during the BRS scan performed between the transmitter 101 and the receiver 102. One or more sets of directional links are selected from the plurality of directional links 105 for an effective beam pair to perform a beamforming diversity communication (i.e., MIMO communication). The one or more directional links are selected from the plurality of directional links 105 based on a predefined selected criterion.

Candidate sets (set 1, set 2) of $N_s$ MIMO streams $B_j$ can be calculated using Equation (13):

$$Bj = \{A0, A1, ANs-1\}. \quad (13)$$

The problem in beam selection in millimeter-wave MIMO systems is to find, in some sense, the optimal MIMO streams, as illustrated in FIG. 1B. The beam pair ordered set can be calculated using Equation (14):

$$\mathscr{C}_{max,N} = [B_j | j=0,1, \ldots N-1], \quad (14)$$

such that Equation (15) satisfies:

$$M(B_0) > M(B_1), \ldots M(B_{N-1}). \quad (15)$$

Here M (•) represents a metric, whose maximization is employed to find the optimal beams. In Equation (15), M ($B_0$) is metric associated with the optimal MIMO stream set, M ($B_1$) is the next optimal and so on. The optimal N beam sets are presented to the higher layers which can then be used to communicate the transmit beams to the BS.

In Equation (7) the parameter N is configurable and can take {1, 2, 4} or other values. The optimal N rather than just a single maximum capacity based set of beams is needed for multiple reasons. In the event of beam-blockages and misalignments, the alternative beams can be used for communication albeit with lesser throughput. It also aids the BS in improved multi-user scheduling at the base station.

One choice of the metric is the received signal strength (RSS). The RSS is synonymously called received power. The RSS on the $l^{th}$ OFDM symbol $[S_l]_{NR \times NT}$ can be calculated using Equation (16):

$$\mathbb{S}_l = \frac{1}{N_h} \sum_{k'=0}^{N_h-1} \hat{H}_l(k') \circ \hat{H}_l^*(k') \quad (16)$$

The optimal N beams based on RSS maximization $\mathscr{C}_{max,N}$, finds the N beams at each receive port in descending order of the highest power using Equation (17):

$$\mathscr{C}_{max,N} = \arg\{\max[S_l]\}. \quad (17)$$

($l=0, 1, \ldots, N_{T \times B} N_{R \times B} - 1$). This method of beam selection is easy to implement. However, it is agnostic to the interferences from other MIMO streams with their associated beams and also other external interference.

A choice of the metric that considers the impact of interfering beams is the information capacity can be calculated using Equation (18):

$$\mathbb{I}(B_j) = \sum_{k=0}^{N_c-1} \log_2 |I_{N_R} + \hat{H}_c(k, B_j) R_{\overline{n},k} \hat{H}_c^H(k, B_j)| \quad (18)$$

Here $\tilde{H}_C(k, B_j)$ is the $N_s \times N_s$ MIMO channel on the $k^{th}$ subcarrier and $$R_{\overline{n},k} = \text{diag}\left\{\frac{SNR_{0,k}}{N_T}, \frac{SNR_{2,k}}{N_T}, \ldots, \frac{SNR_{N_T-1,k}}{N_T}\right\}$$

The $SNR_{i,k}$ here includes the array gain ($N^{RF}_T N^{RF}_R$) due to the transmit and receive beamforming. This method is effective, but involves very high computational complexity even for typical values of the number of beams and antennas.

The optimal N sets of beam ID pairs is tabulated as shown in Tables 1 and 2 below.

TABLE 1

| | BP$_1$ | BP$_2$ | . . . | BPN$_S$ |
|---|---|---|---|---|
| 1 | B$_j$D$_j$ | | | |
| | B$_j$D$_1$ | | | |
| 2 | | | | |
| 3 | | | | |
| . | | | | |
| . | | | | |
| . | | | | |
| N | | | | |

TABLE 2

| Parameter | Value 0 | Value 1 |
|---|---|---|
| N$_T$-Number of transmitter antenna ports | 8 | 8 |
| N$_R$-Number of receiver antenna ports | 2 | 2 |
| Max MIMO Streams | 2 | 2 |
| N$_{TxBID}$-No. of transmitter beam ID | 14 | 28 |
| N$_{RxBID}$-No. of receiver beam ID | 8 | 8 |
| Number of Beam-ID pair combinations to be searched for optimal 2 MIMO streams | 3010561 | 12042241 |

The exhaustive search complexity is too high even for simple configurations. The typical time constraints from evolving 5G specification is less than 0.4 ms. Therefore real time constraints are not obtained using the existing methods, and as such, optimal solutions are required, with reduced complexity which reduces search space, exploits sparsity, and provides sub-frame based processing.

Figure 2:
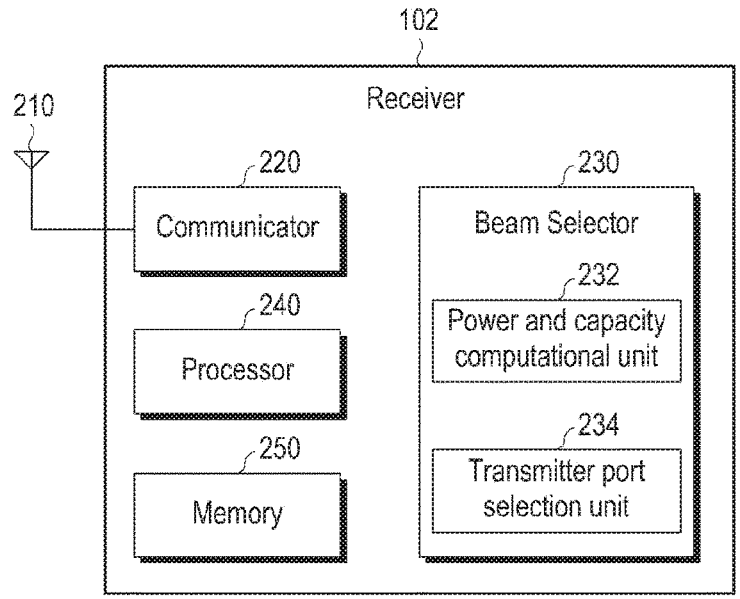
FIG. 2 is a diagram of hardware components of the receiver, according to an embodiment.

FIG. 2 is a diagram of various hardware components of the receiver 102, according to an embodiment of the disclosure. The receiver 102 includes a communicator 220, a beam pair selector 230, a processor 240, and a memory 250.

The communicator 220 coupled with antenna 210 (e.g., RF antenna) can be configured to communicate with various other apparatuses in the wireless communication network 100. The other apparatuses can include other BSs, MSs, remote terminals, the UE, and the like. Further, the communicator 220 can be configured to internally communicate with other components of the receiver 102.

The beam pair selector 230 is communicatively coupled with the communicator 220 and the processor 240, and the beam pair selector 230 is configured to estimate and select the optimal beam ID pairs. The beam pair selector 230 includes a power and capacity computational unit 232 and a transmitter port selection unit 234.

The power and capacity computational unit 232 is configured to obtain a first power matrix and a second capacity matrix to determine the optimal beam pairs associated with transmit and receive ports. The optimal "N" beams of all the transmit antenna array for each receive antenna array is based on an average power computation and energy thresholding. Further, the optimal "N" capacity or SINR maximizing beams are found from $R^0_{Nt \times P}$ and $R^1_{Nt \times P}$. The detailed operation of the power and capacity computational unit 232 is provided with reference to FIG. 3.

Unlike to conventional methods and systems, the proposed method can be used to provide a robust and reliable estimates of the optimal "N" sets of transmit and receive beam-pairs in MIMO communication systems with reduced complexity. The power and capacity computational unit 232 can be configured to determine the sets of optimal beams based on a sub-frame basis using the exhaustive beam-scan information. Thus, by virtue of the proposed method an up-to-date beam-pair information at the end of every BRS sub-frame can be obtained (as detailed in the FIG. 3).

Unlike to conventional methods and systems, the proposed method can be used to generate and update the first power matrix including the first power matrices for each of the receive ports (e.g., sets of beam pairs for all transmit ports per receiver port for OFDM level processing). As the first power matrix only includes the optimal beam pairs determined based on average power threshold of each such set of beam pairs meets the threshold, the search space required for computing the capacity maximization beam pairs (resultant from the average power measurement and thresholding) are reduced. Further, the optimal beam pair obtained from the computation of the capacity maximization beam pairs (obtained from the first power matrix) are used to form the second capacity matrix, wherein one or more sets of optimal beam pairs associated with the transmit and receive ports is selected from the second capacity matrix.

The transmitter port selection unit 234 is configured to identify new transmit ports associated with optimal beams pairs per receiver port. The transmitter port selection unit 234 is configured to compute the average power for each beam pair in the OFDM symbol level processing. The new transmit ports associated with the optimal beams pairs, retrieved from the OFDM symbol computation, are then computed in the sub-frame level. The optimal beams pairs associated with updated transmit ports, retrieved from the sub-frame level computation, and are computed to determine the set of beam ID pairs constituting the capacity maximization based on the sub-frame level computation. A third matrix including the set of beam ID pairs per updated transmit port can also be created. The detailed operation of identifying the optimal set of beam ID pairs from the third matrix is explained with reference to FIG. 4.

Unlike conventional methods and systems, the proposed method can be used to provide a global optimum of pairs of optimal beams of all the MIMO streams.

The processor 240 performs actions based on the instructions provided by the beam pair selector 230. The processor 240 can be a hardware unit, an apparatus, a central processing unit (CPU). The memory 250 includes storage locations that are addressable through the processor 240. The memory 250 can be, but is not limited to, a volatile memory and/or a non-volatile memory. The memory can include one or more non-transitory computer-readable storage media. The memory 250 may include non-volatile storage elements. For example the non-volatile storage elements may include magnetic hard discs, optical discs, floppy discs, flash memories, or forms of electrically programmable memories (EPROM) or electrically erasable and programmable (EEPROM) memories. The memory 250 can store the optimal P beam ID pairs which can be used for reliable communication (i.e., beamforming transmit and received data signals).

Figure 3:
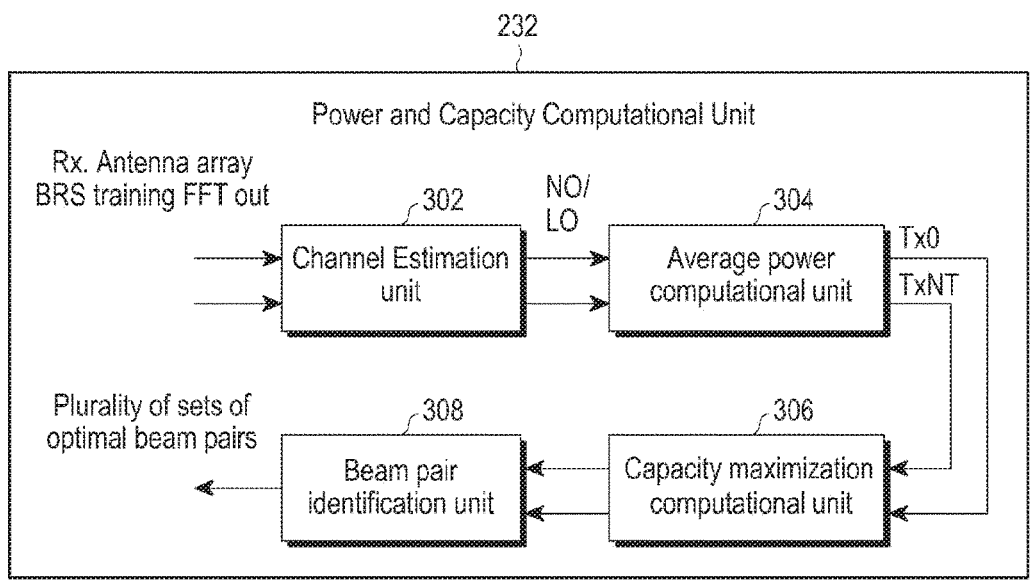
FIG. 3 is a diagram of hardware components of the power and capacity computational unit of the receiver, according to an embodiment.

FIG. 3 is a diagram of various hardware components of the power and capacity computational unit 232, according to an embodiment of the disclosure.

The power and capacity computational unit 232 includes a channel estimation unit 302, an average power computational unit 304, a capacity maximization computational unit 306, and a beam pair identification unit 308.

As detailed in the FIG. 1A, $y_l(k)$ gives us all information of the transmit and receive beam-ID but does not give information of the ports. For this, the $N_T$ $N_R$ $N_{T \times B}$ $N_{R \times B}$ channel estimates are needed from $y_l(k)$. Thus, the effective beam formed channels from all the transmit antenna ports are estimated at each of the received antenna ports (see Equations (11) and (12)).

Further, from one received OFDM symbol, the channel estimation unit 302 is configured to obtain the estimates for $\{A_i | i=0, 1, \ldots, N_R N_T\}$ such channels for the duration of $\Delta_r$, the channel estimation unit 302 obtains $N_R$ $N_{T \times B}$ $N_{R \times B}$ channels and for the duration of $\Delta_r$, all $N_T$ $N_R$ $N_{T \times B}$ $N_{R \times B}$ channels are obtained (as detailed in the FIG. 1A).

The average power computational unit 304 is configured to eliminate low signal strength channels from the channels Ai using a power computation. From each received 1 OFDM symbol, the average power computational unit 304 calculates $S_l$ (as in Equation (16)).

The average power computational unit 304 is configured to compare the $S_l$ with a predefined power threshold $P_{th}$. If the $S_l$ exceeds $P_{th}$ then the average power computational unit 304 populate the transmitter antenna ports in a look up table (LUT) $L_r$, $0 < r \le N_R - 1$ for each receiver antenna port.

The LUT can be associated with the memory 250. The LUT can be associated with a server remotely accessible by the receiver 130 using the wireless network. Each row of the LUTs are populated with the indices associated with optimal beam-ID pairs per transmit-receive port. The optimal beam ID pairs are defined as the beam ID pairs having maximum power. The $L_r$ can be updated on a per-OFDM basis. The $L_r$ is can be calculated using Equation (19):

$$Lr[t,:] = \arg\{\max_N \{S_l[t,r]\}\}, r=0,1 \ldots, N_{r-1}$$

$$t=0,1 \ldots, N_{T-1}$$

$$l=0,1 \ldots, N_{T \times B} N_{R \times B} - 1. \quad (19)$$

The capacity maximization unit 306 is configured to identify whether the OFDM symbol processing in the BRS sub-frame is over. If the BRS sub-frame processing is high, the capacity maximization unit 306 is configured to perform capacity maximization search on the reduced set of beam ID pairs characterized by Lr.

The CM of each beam ID pair will be selected based on the SINR associated with each beam. If the X transmit beam and Y receive beam pair is considered to be associated with increased SINR, the "X" transmit beam and "Y" receive beam pair is said to be the beam pair with a maximum capacity.

The CM computation unit 306 is configured to update the capacity maximization beam pair corresponding to each entry of Lr in Equation (19) and form the second capacity matrix. The directional link Bi can be expressed as in Equation (13) and can be calculated using Equation (20):

$$Bi = \{Aj \rightarrow Lj[m,n], j=0,1,\ldots, NS-1\} \quad (20)$$

Here (m=0, 1, . . . , NT−1), (n=0, 1, . . . , N−1). The capacity maximizing streams of optimal "P" beam pairs can be calculated using Equation (21:

$$\mathscr{C}_{max,N} = \arg[\max_N \{H(B_i)\}], i = 0, , 1, \ldots, (N_T N)^{N_s} - 1 \quad (21)$$

The search space over which capacity is maximized is $(N_T N)^{N_s}$. The initial power computation based reduction in the search space makes the capacity based search space independent of NT×B and NR×B thus reducing the complexity.

The beam pair identification unit 308 is configured to identify the one or more sets of optimal beam pairs associated with the transmit and receive ports, which are selected from the second capacity matrix.

Therefore based on the above method, the search space is reduced from 3010261 to 1024, as shown in Table 3 below.

TABLE 3

| Parameter | Exhaustive | Proposed |
|---|---|---|
| $N_T$-Number of transmitter antenna ports | 8 | 8 |
| $N_R$-Number of receiver antenna ports | 2 | 2 |
| Max MIMO Streams | 2 | 2 |
| $N_{TxBID}$-No. of transmitter beam ID | 14 | 14 |
| $N_{RxBID}$-No. of receiver beam ID | 8 | 8 |
| Number of Beam-ID pair combinations to be searched for optimal 2 MIMO streams | 3010561 | 1024 |

Figure 4:
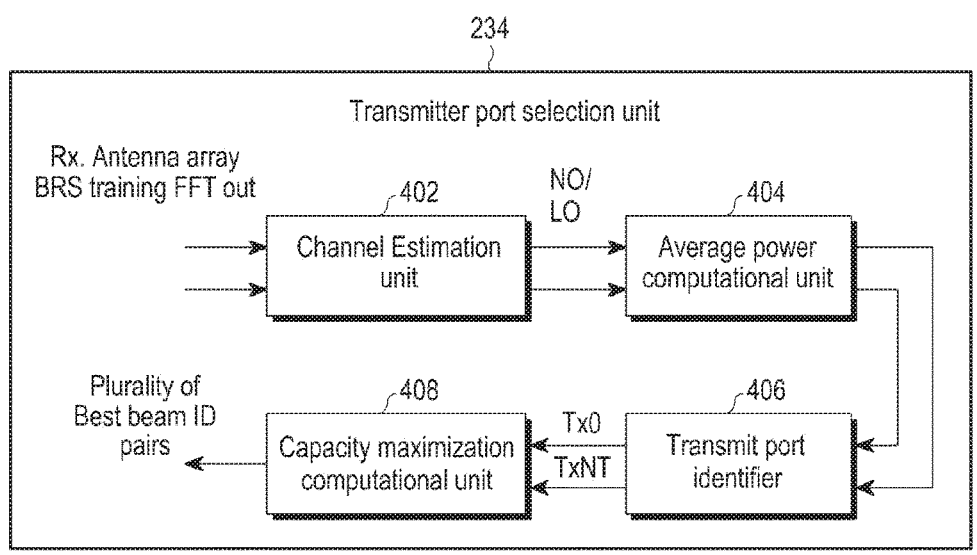
FIG. 4 is a diagram of hardware components of the transmitter port selection unit of the receiver, according to an embodiment.

FIG. 4 is a diagram of various hardware components of the transmitter port selection unit 234, according to an embodiment of the disclosure. The transmitter port selection unit 234 includes a channel estimation unit 402, an average power computational unit 404, a transmitter port identifier 406, and a capacity maximization computational unit 408.

The channel estimation unit 402 is configured to obtain the estimates for {Ai|i=0, 1, . . . , NR NT} such channels for the duration of Δt, the channel estimation unit 302 obtains NR NT×B NR×B channels and for the duration of Δr all NT NR NT×B NR×B channels are obtained (as detailed in the FIG. 1A).

The average power computational unit 404 is configured to obtain the new transmit ports associated with optimal beams pairs per receiver port. The new transmit ports associated with the optimal beams pairs are retrieved from the OFDM symbol computation and computed in the sub-frame level. The average power computational unit 404 is configured to compute the average power for each beam pair in the OFDM symbol level processing. The optimal beams pairs associated with updated transmit ports are retrieved from the sub-frame level computation, and are computed to determine the P beam ID pairs constituting the capacity maximization based on the sub-frame level computation as explained in FIG. 3. Average power computational unit 404 is configured to generate the third matrix including the P beam ID pairs per updated transmit port.

The transmit port identifier 406 is configured to continuously update the third matrix with both new and old transmitter ports identified in the BRS sub-frame level.

The capacity maximization computational unit 416 is configured to perform a two stage capacity maximization on the reduced set of beam ID pairs characterized by Lr for identifying the capacity maximizing beam ID pairs $\mathscr{C}_{max,1}^{I}$ with reduced complexity. Hence the ordered set optimal beams can be calculated using Equation (22):

$$\mathscr{C}_{max,1}^{I}=[B_j|j=0]=\{A_0,A_1\}. \quad (22)$$

The two stage capacity maximization include diagonal search and global optimal search. The detailed operation of both diagonal search and global optimal search are provided with reference to FIG. 7.

Figure 5A:
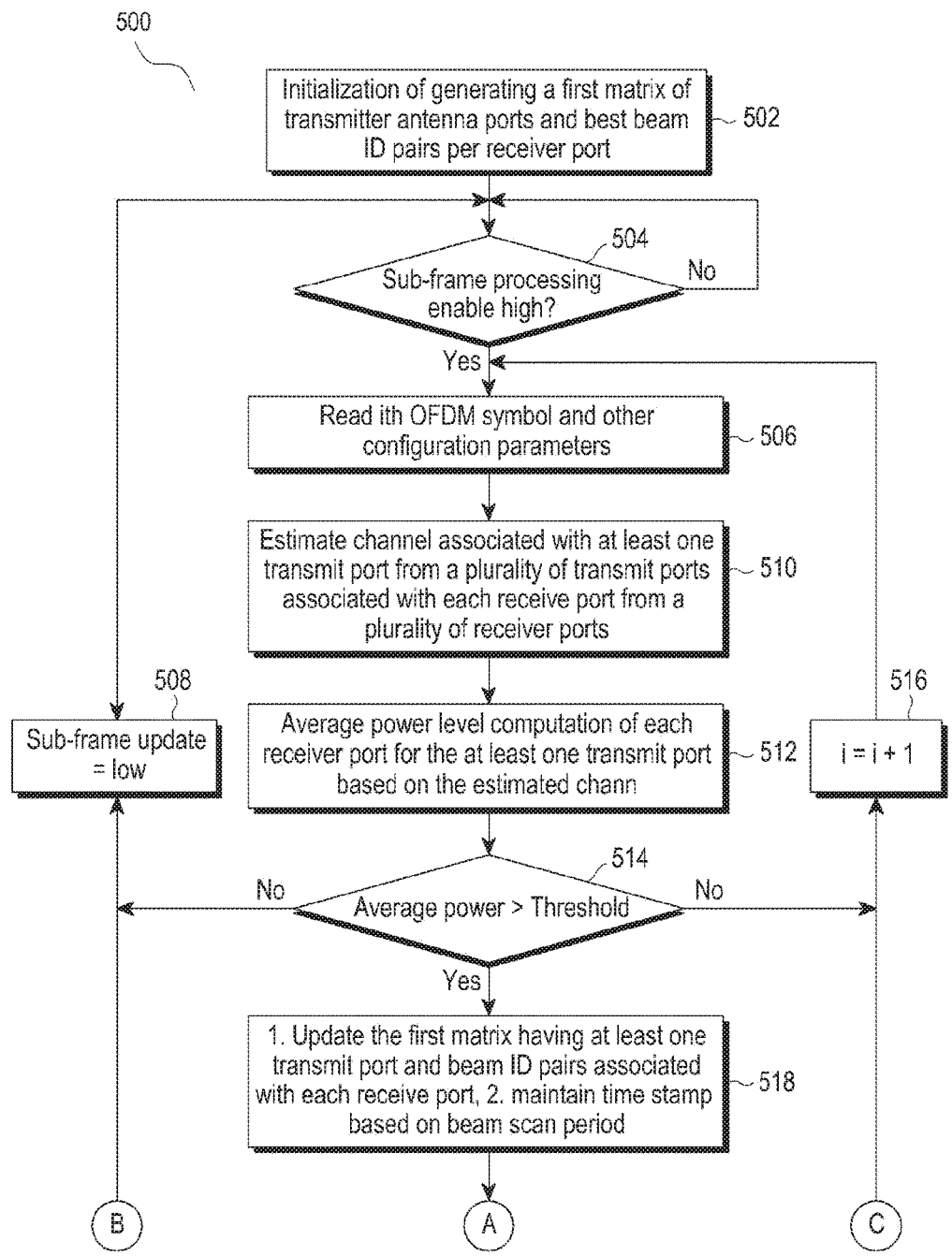
FIGS. 5A-5B are flowcharts of a method of selecting beam ID pairs associated with a transmitter antenna array and a receiver antenna array, according to an embodiment.
Figure 5B:
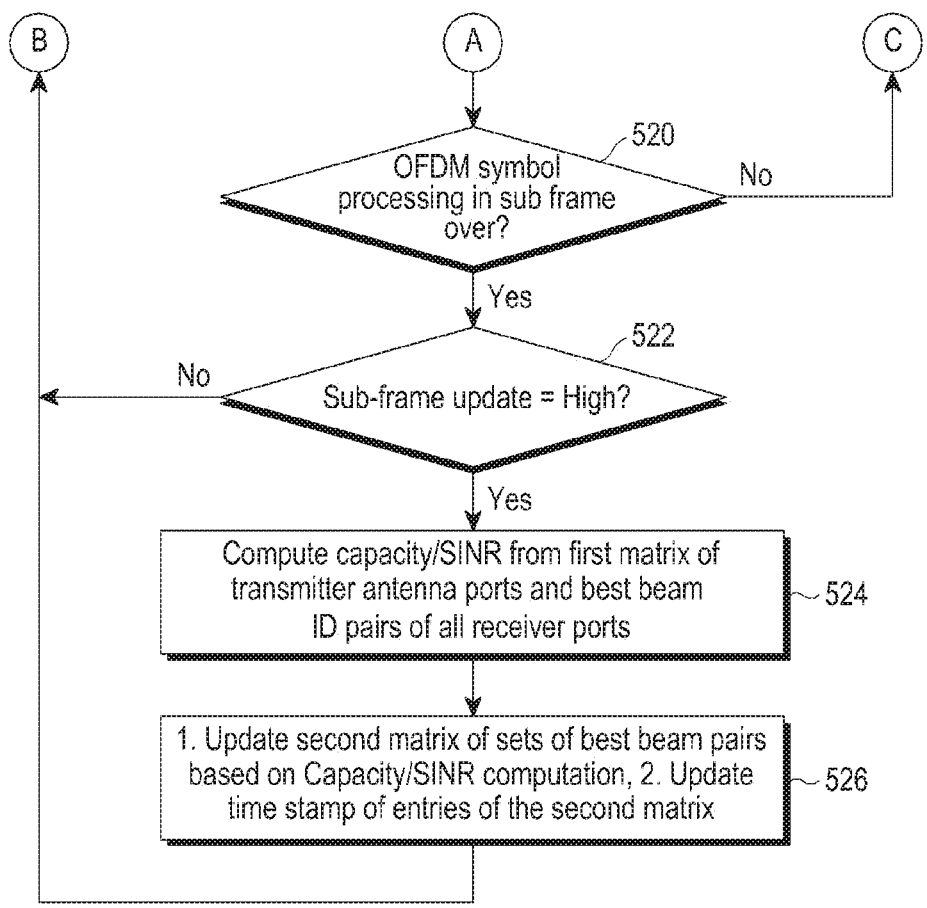

FIGS. 5A-5B are flowcharts of a method of selecting beam ID pairs associated with a transmitter antenna array and a receiver antenna array, according to an embodiment of the disclosure.

At step 502, the method includes generating a first matrix of transmitter antenna ports and optimal beam ID pairs per receiver port using the power and capacity computational unit 232. At step 504, the method includes determining the sub-frame processing is high or not. If the sub-frame processing is high, the method includes reading OFDM symbols and other configuration parameters associated with transmitter antenna ports and optimal beam ID pairs, at step 506. Alternatively, the method includes determining if the sub-frame processing is low, at step 508.

The method allows the power and capacity computational unit 232 to read OFDM symbols (and other configuration parameters associated with transmitter antenna ports and optimal transmit) and receive beam ID pairs for each and every receiver port.

At step 510, the method includes estimating channels associated with at least one transmit port from a plurality of transmit ports associated with each receive port from a plurality of receiver ports using the channel estimation unit 302.

At step 512, the method includes computing average power level of each receiver port for the at least one transmit port based on estimated channel using the average power computational unit 304.

At step 514, the method includes comparing the average power level of each receiver port with the predefined power threshold using the average power computational unit 304.

If the average power level of each receiver port is greater than the predefined power threshold, the method includes updating the first matrix having at least one transmit port and beam ID pairs associated with each receive port and maintaining time stamp based on beam scan period, at step 516, using the average power computational unit 304.

Alternatively, if the average power level of each receiver port is not greater than the predefined power threshold, the method includes reading the OFDM symbol and other configuration parameters associated with transmitter antenna ports and optimal beam ID pairs, at step 518, without updating the first power matrix.

At step 520, the method includes determining whether the OFDM symbol processing in symbol is over or not using the capacity maximization unit 306.

If the OFDM symbol processing in symbol is over, the method includes determining whether the sub-frame update is high or not at step 520 using the capacity maximization unit 306. Alternatively, if the OFDM symbol processing in symbol is not over, the method includes reading the OFDM symbol and other configuration parameters associated with transmitter antenna ports and optimal beam ID pairs, at step 520.

At step 522, the method includes determining whether the sub-frame update is high or not using the capacity maximization unit 306.

If the sub-frame update is high, the method includes computing from first matrix of transmitter antenna ports and optimal beam ID pairs of all receiver ports, at step 524, using the capacity maximization unit 306.

Alternatively, if the sub-frame update is not high, the method includes indicating the sub-frame level as low using the capacity maximization unit 306.

At step 526, the method includes updating a second matrix of sets of optimal beam pairs based on capacity/SINR computation and updating a time stamp of entries of the second matrix using the beam pair identification unit 308.

Figure 6:
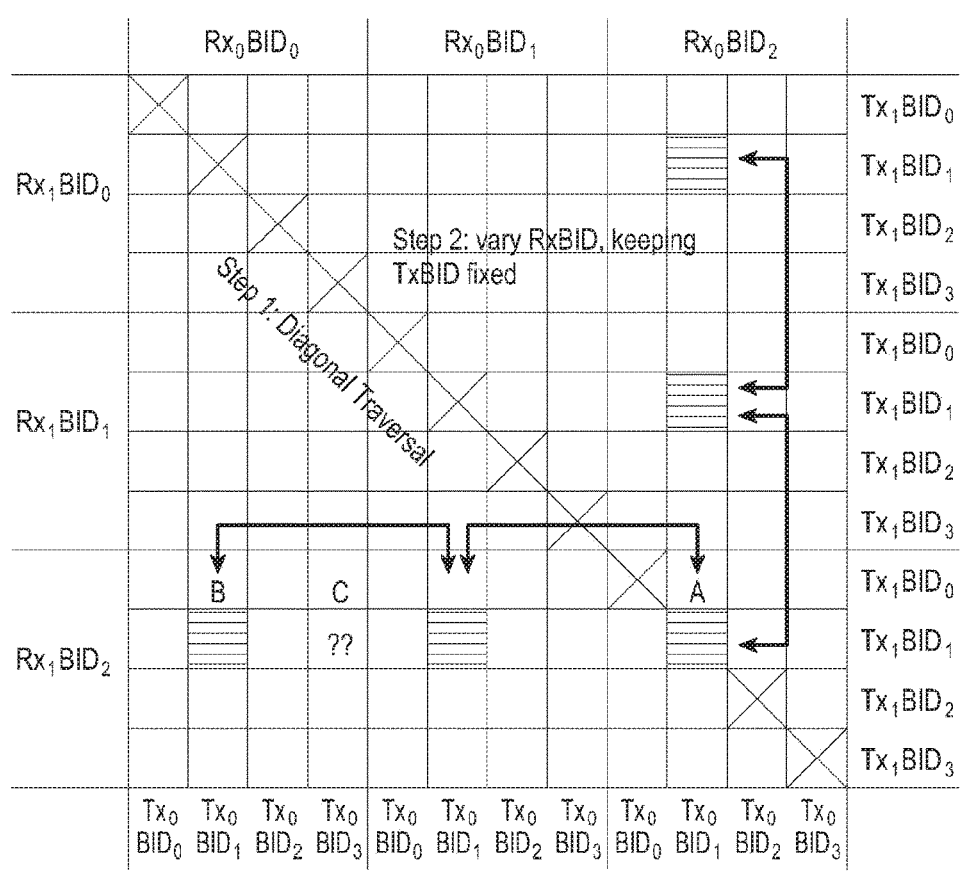

FIG. 6 is a diagram of a matrix 600 for selecting a plurality of set of optimal beam ID pairs, according to known prior art.

Consider a scenario having $N_T=N_R=N_S=2$, $N_{T\times B}=4$ and $N_{R\times B}=3$ which forms the matrix 600. A point C associated with a beam ID pair $(Tx_0BID_3, Rx_0BID_0)$ is the capacity maximizing optimal point that needs to be estimated at the receiver 102. In conventional methods, to identify the optimal beam ID pair a diagonal search is performed across the matrix 600 and the local maxima position A is identified. However, during the diagonal search the point C is not identified which the optimal beam ID pair is not known. Therefore, to avoid this complexity a matrix of FIG. 7 is provided.

Figure 7:
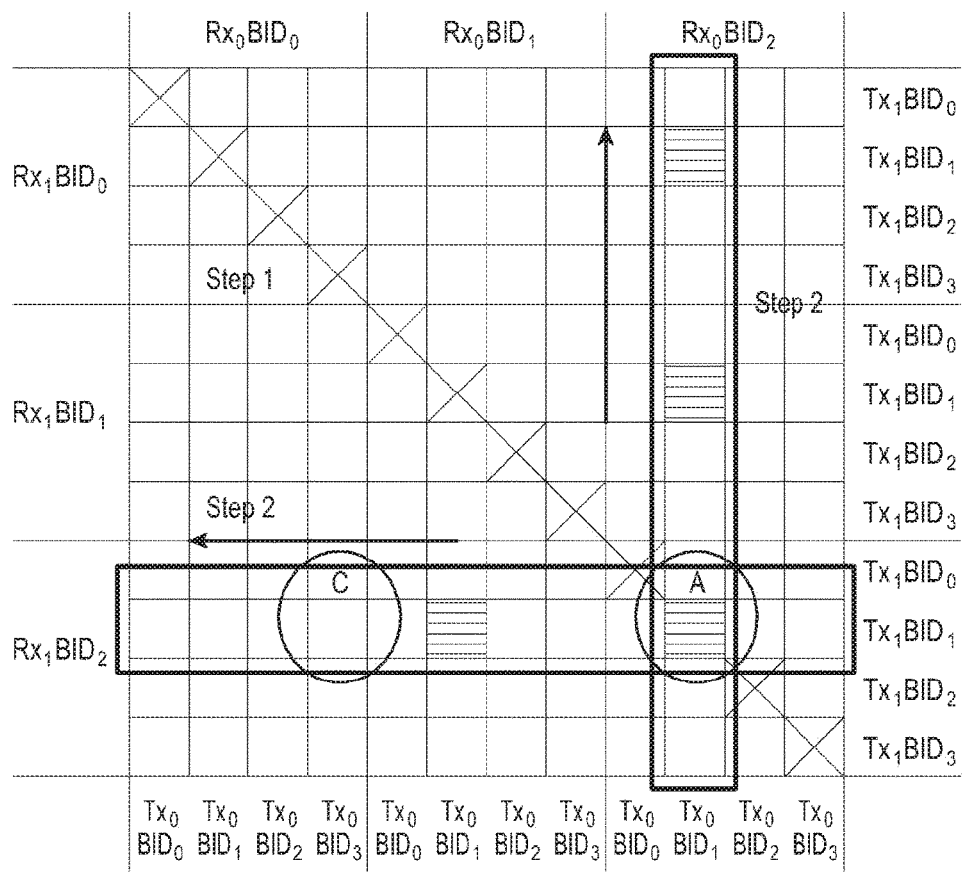
FIG. 7 is a diagram of a matrix for selecting a plurality of set of optimal beam ID pairs, according to an embodiment.

FIG. 7 is a diagram of a matrix 700 for selecting a plurality of set of the optimal beam ID pairs, according to an embodiment of the disclosure. Consider a scenario of the $N_T=N_R=N_S=2$, $N_{T\times B}=4$ and $N_{R\times B}=3$ which form the matrix 700.

To identify the optimal beam ID pair a two stage capacity maximization based method is used, as it is applicable only for N=1. The two stage capacity maximization based method estimates capacity maximizing beam pair set $\mathscr{C}_{max,1}^{I}$ with reduced complexity. Hence the ordered set optimal beams can be expressed using Equation (22).

The two stage capacity maximization includes a diagonal search and a global optimal search.

Diagonal Search:

The diagonal search constrains the indices to compute Equation (18) using Equation 23:

$$(q=s)=0,1,\ldots,N_{R\times B}-1$$

$$(p=r)=0,1,\ldots,N_{T\times B}-1. \quad (23)$$

$\tilde{H}_c(k, B_j)$ matrix is obtained using Equation (20) from the indices in Equation (23) and substitute the result into Equation (18). With these restrictions, the capacity maximizing MIMO stream is obtained. By restricting the search space from Equation (21) to these indices in (23), a local capacity maxima is arrived. At least one of the optimal beam-pairs $A_0$ or $A_1$ in Equation (22) is present in this. Hence a local maxima can be calculated using Equation (24):

$$\mathscr{C}'_{max,1}=\{A_p,A_q\}=\{A_0,A_q\} \text{ or } \{A_p,A_1\} \quad (24)$$

Owing to Equation (23), this stage has a search space complexity of $N_{T\times B}N_{R\times B}$. To resolve the ambiguity in $\mathscr{C}'_{max,1}$ in Equation (24) and arrive at the global solution, the next stage is required.

Global optimum search: In this stage, the local maxima indices in Equation (24) is used to arrive at the global maxima. Here as a first step the index $A_p$ is kept fixed and $A_q$ is varied across all possibilities. Hence the indices in Equation (19) can be calculated using Equation (25):

$$s=0,1,\ldots,N_{R\times B}-1$$

$$r=0,1,\ldots,N_{T\times B}-1. \quad (25)$$

For each index in Equation (24), $\tilde{H}_c(k, B_j)$ as in Equation (20) is computed and substituted in Equation (18) and the optimal MIMO stream is obtained. Let the maximum capacity beam at this step be represented as $\mathscr{C}''_{max,1}$ Next the index set $A_q$ is kept fixed and $A_p$ and is calculated using Equation (26):

$$q=0,1,\ldots,N_{R\times B}-1$$

$$p=0,1,\ldots,N_{T\times B}-1. \quad (26)$$

For each of these indices, the capacity as in Equation (18) is computed using the same procedure as before. Let the maximum capacity beam at this step be represented as $\mathscr{C}'''_{max,1}$. The maximum capacity beam-pair set of all these is chosen as the optimal beam-ID pair stream and is calculated using Equation (27):

$$\mathscr{C}_{max,1}=\arg\max\{\mathbb{I}\,(\mathscr{C}'_{max,1},\mathscr{C}''_{max,1},\mathscr{C}'''_{max,1})\}. \quad (27)$$

The complexity of the global optimum search stage is given by $N_s N_{T\times B} N_{R\times B}$. The overall complexity of this scheme turns out to be $N_{T\times B}N_{R\times B}(1+N_s)$.

In FIG. 7 a point 'C' associated with a beam ID pair (Tx0BID3, Rx0BID0) is the capacity maximizing optimal point that needs to be estimated at the receiver 102. To identify the optimal beam ID pair, first the diagonal search (i.e., step 1) is performed across the matrix 700 which the local maxima position A is identified as per the Equation (24). Further, the local maxima position A is anchored to perform the global optimal search (i.e., step 2) as per Equations (25) and (26). After performing the global optimal search (i.e., step 2) the global optimal position is obtained as per Equation (26).

Unlike the conventional methods and systems, the proposed method identifies the optimal beam ID pairs using both the diagonal search and the global optimal search.

Figure 8:
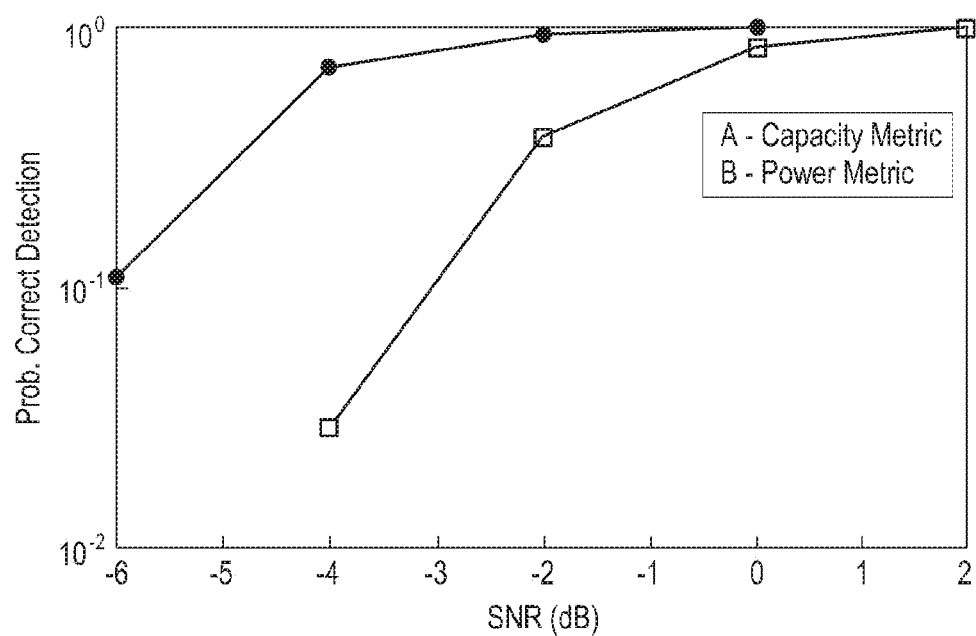
FIG. 8 is a graph of a probability of correct detection comparison of the hybrid power and capacity maximization scheme with the received signal strength based scheme in presence of interference, according to an embodiment.

FIG. 8 is a graph representing a probability of correct detection comparison of the hybrid power and capacity maximization scheme with the received signal strength based scheme in presence of interference, according to an embodiment of the disclosure.

In FIG. 8, a curve A represents a capacity metric and a curve B represents a power metric. The BRS based channel estimation are used for both power and capacity metric computations. The probability of correct beam pair detection (Pcd) is plotted against SNR (Db) in an interference scenario. Further, capacity metric based RF beam search technique outperforms SNR/Power based techniques by >2 dB and gains expected to increase under inter-cell/inter-BS interfering scenarios.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method of selecting a plurality of sets of beam pairs in a wireless communication system, the method comprising:

estimating, by a receiver, channels associated with a plurality of transmit ports for each receive port of a plurality of receive ports; and determining, by the receiver, the plurality of sets of the beam pairs including transmit beam and receive beam using:

an average power level at each receive port for at least one transmit port based on the estimated channel associated between the beam pairs, a set of first power matrices, wherein each first power matrix, from the set of first power matrices, comprises at least one transmit port, beam ID pairs including transmit beam ID and receive beam ID associated with each receive port, wherein the set of first power matrices is formed based on the average power level at each of the receive port, and a second capacity matrix formed based on capacity maximization obtained from the set of first power matrices, wherein the plurality of sets of the beam pairs associated with each of the transmit port and receive port is selected from the second capacity matrix.

2. The method of claim 1, wherein the average power level at each receive port for at least one transmit port based on the estimated channel associated between the beam pairs is determined by:

computing the average power level at each receive port for at least one transmit port based on the estimated channel; and determining whether the average power level of each receive port for at least one transmit port meets a power level threshold.

3. The method of claim 1, wherein the capacity maximization, obtained from the set of first power matrices, is determined based on one of maximizing a signal-to-interference plus noise ratio (SINR) and a function of SINR associated with one or more sets of the transmit beam and receive beam pairs associated with the plurality of receive antenna ports.

4. The method of claim 1, wherein one or more sets of capacity maximizing beam pairs comprises one of a number of elements where each element is associated with a transmit port number, a receive port number, the beam ID pairs.

5. The method of claim 1, wherein determining the plurality of sets of the beam pairs comprises:
identifying at least one beam ID pairs by traversing diagonally across a third matrix;
anchoring the at least one beam ID pairs identified in the third matrix;
performing a scan over at least one beam ID pairs in the third matrix using the at least one anchored ID pairs; and
determining, by the receiver, the plurality of sets of the beam pairs based on the scan over the at least one anchored beam ID pairs.

6. The method of claim 5, wherein the third matrix is determined based on the estimated channel associated with at least one transmit port of a plurality of transmit ports associated with each receive port of a plurality of receive ports.

7. A method of selecting a plurality of sets of beam pairs in a wireless communication system, the method comprising:
estimating, by a receiver, channels associated with a plurality of transmit ports for each receive port of a plurality of receive ports; and
determining, by the receiver, the plurality of sets of the beam pairs including transmit beam and receive beam by:
identifying at least one beam ID pairs including transmit beam ID and receive beam ID by traversing diagonally across a first matrix,
anchoring, by the receiver, the at least one beam ID pairs identified in the first matrix,
performing, by the receiver, a scan over at least one beam ID pairs in the first matrix using the at least one anchored beam ID pairs, and
determining, by the receiver, the plurality of sets of the beam pairs based on the scan over the at least one anchored beam ID pairs.

8. The method of claim 7, wherein the first matrix is determined based on the estimated channel associated with a plurality of transmit ports for each receive port of a plurality of receiver ports.

9. The method of claim 7, wherein at least one set of the beam pairs of the plurality of sets of the beam pairs comprises one of a number of elements where each element is associated with a transmit port number, a receive port number, the beam ID pairs.

10. A receiver for selecting a plurality of optimal beam pairs in a wireless communication system, the receiver comprises:
a memory,
a processor, coupled to the memory, and
a beam pair selector, coupled to the processor and, configured to:
estimate channels associated with a plurality of transmit ports for each receive port of a plurality of receiver ports for the beam pairs including transmit beam and receive beam; and
determine the plurality of sets of the beam pairs using:
average power level at each receive port for at least one transmit port based on the estimated channel associated between the beam pairs,
a set of first power matrices, wherein each first power matrix, from the set of power matrices, comprises at least one transmit port, beam ID pairs including transmit beam ID and receive beam ID associated with each receive port, wherein the set of first power matrices is formed based on the average power level at each of the receive port, and
a second capacity matrix formed based on capacity maximization obtained from the set of first power matrices, wherein the plurality of sets of the beam pairs associated with each of the transmit port and receive ports is selected from the second capacity matrix.

11. The receiver of claim 10, wherein the average power level at each receiver port for at least one transmit port based on the estimated channel associated between the beam pairs is determined by:
computing the average power level at each receive port for at least one transmit port based on the estimated channel; and
determining whether the average power level of each receive port for at least one transmit port meets a power level threshold.

12. The receiver of claim 10, wherein the capacity maximization obtained from the set of first power matrices is determined based on one of maximizing a signal-to-interference plus noise ratio (SINR) and a function of SINR associated with one or more sets of the beam pairs associated with the plurality of receive antenna ports.

13. The receiver of claim 10, wherein one or more sets of capacity maximizing beam pairs comprises one of a number of elements where each element is associated with a transmit port number, a receive port number, the beam ID pairs.

14. The receiver of claim 10, wherein determining one set of the beam pairs comprises:
identifying at least one beam ID pairs by traversing diagonally across a third matrix;
anchoring the at least one beam ID pairs identified in the third matrix;
performing a scan over at least one beam ID pair in the third matrix using the at least one anchored beam ID pairs; and
determining the plurality of sets of the beam pairs based on the scan over the at least one anchored beam ID pairs.

15. The receiver of claim 14, wherein the third matrix is determined based on the estimated channel associated with at least one transmit port of a plurality of transmit ports associated with each receive port of a plurality of receiver ports and the associated transmit beam and receive beam pairs.

16. A receiver for selecting a plurality of sets of beam pairs in a wireless communication system, the receiver comprises:
a memory,
a processor, coupled to the memory, and
a beam pair selector, coupled to the processor, configured to:
estimate channels associated with a plurality of transmit ports for each receive port from a plurality of receive ports, and
determine the plurality of sets of the beam pairs including transmit beam and receive beam by:
identifying at least one beam ID pairs including transmit beam ID and receive beam ID by traversing diagonally across a first matrix,
anchoring the at least one beam ID pairs identified in the first matrix, performing a scan over at least one beam ID pairs in the first matrix using the at least one anchored beam ID pairs, and determining the plurality of sets of the beam pairs based on the scan over the at least one anchored beam ID pairs.

17. The receiver of claim 16, wherein the first matrix is determined based on the estimated channel associated with a plurality of transmit ports for each receive port from a plurality of receiver ports and the associated beam pairs.

18. The receiver of claim 16, wherein at least one set of the beam pairs from the plurality of sets of the beam pairs comprises one of a number of elements where each element is associated with a transmit port number, a receive port number, the beam ID pairs.

* * * * *